Figure 2:
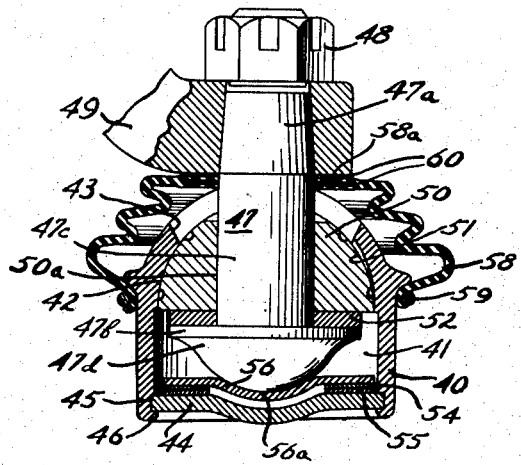

April 15, 1952   J. H. BOOTH   2,593,253
JOINT
Filed Dec. 20, 1947

Inventor
JAMES H. BOOTH
by [signature] Attys.

Patented Apr. 15, 1952

2,593,253

UNITED STATES PATENT OFFICE 2,593,253

JOINT

James H. Booth, Venice, Mich., assignor to Thompson Products, Inc., Cleveland, Ohio, a corporation of Ohio Application December 20, 1947, Serial No. 792,896

1 Claim. (Cl. 287—90)

This invention relates to joint structures having separate pairs of bearing surfaces for tilting movement of a joint stud relative to its housing and for rotation of the stud about its own axis under controlled resistance conditions.

More specifically, this invention relates to a joint structure in which resistance to rotation is controlled by a thrust washer having predetermined frictional gripping characteristics to produce a break-away resistance upon initial relative rotation which is substantially the same as the resistance to continued relative movement of the parts.

This application is a continuation-in-part of my copending application entitled "Front Wheel Suspension," Serial No. 781,996, filed October 24, 1947, now Patent No. 2,521,335 issued September 5, 1950.

According to this invention, a socket member or housing has a substantially cylindrical chamber provided near one end with a segmental spherical bearing surface terminating in a reduced diameter opening. An annular bearing member having a segmental spherical bearing surface is tiltably mounted in the housing. A headed stud is disposed in the housing and has a cylindrical shank portion extending freely through the ring and the reduced diameter opening of the housing. The thrust washer is disposed about the stud shank between the annular bearing member and the head of the stud. This washer may be made of various materials to produce the desired break-away and continued constant frictional resistance between the washer and the surface of the stud head and between the washer and the surface of the annular bearing member. Materials such as Nylon, bronze, glazed phenolic resin impregnated fabrics and the like are useful.

The joints of this invention are especially useful in independent front wheel suspensions for automobiles between the upper control arm and the wheel knuckle as disclosed in my parent application Serial No. 781,996, now Patent No. 2,521,335. In such assemblies constant controlled relatively free rotation of the stud is necessary for quick and easy steering of the road wheel but anti-friction assemblies are unsatisfactory because they permit wheel shimmy.

In an important modification of the joint of this invention, the friction controlling washer is disposed between a pair of hardened steel thrust washers, one of which abuts the head of the stud while the other bears against the lower end of the tiltable bearing member.

It is therefore an object of the present invention to provide a joint in which the frictional resistance to movement of the parts is controlled by an added member possessing predetermined frictional characteristics.

A further object of this invention is to produce a joint which will have a constant controlled frictional resistance to relative movement of the parts thereof.

A still further object of this invention is to provide a stud equipped joint in which the shank of the stud is rotatably mounted in a tiltable bearing and in which resistance to rotation is controlled by a washer between the stud head and bearing.

A specific object is to provide a ball and socket type joint especially useful in independent front wheel suspensions for automobiles to accommodate raising and lowering movements of the wheel and easy steering movement of the wheel without permitting wheel shimmy.

Other and further objects and features of this invention will be apparent to those skilled in the art from the following detailed description of the annexed sheet of drawings which, by way of preferred examples, illustrate two embodiments of the invention.

Figure 1:
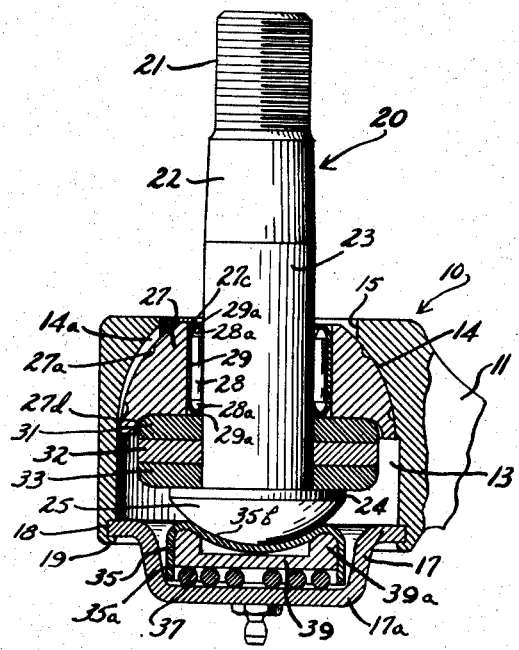

On the drawings:

Figure 1 is a fragmentary axial cross-sectional view, with parts in elevation, of an assembled joint structure according to this invention; and Figure 2 is an axial cross-sectional view, with parts in elevation, of a second embodiment of the joint structure of this invention.

As shown on the drawings:

In Figure 1, the reference numeral 10 indicates generally an open ended housing member having a laterally extending arm 11 integral therewith and adapted to be anchored in a mounting bracket or the like of a wheel suspension arm. The housing 10 has a substantially cylindrical bore 13 therein, provided near one end with a segmental spherical bearing surface 14 converging to a reduced diameter opening 15. The other end of the housing is enclosed by a cap 17 which has a recessed central portion 17a and is seated in a groove 18 formed within the housing wall. The plate 17 is held in position by peening or spinning the end of the housing thereover as indicated at 19.

A joint stud 20 projects through the opening 15, and has a cylindrical shank with a threaded end portion 21, an intermediate tapered portion 22, a cylindrical bearing portion 23, and a head providing an annular shoulder 24 near the bottom of the shank and a rounded end 25 below the shoulder 24.

Tilting movement of the stud 20 relative to the housing 10 is provided by a bearing ring or seat 27 which has a segmental spherical outer surface cooperating with the spherical bearing surface 14 of the housing 10. To provide lubrication between these spherical surfaces, a series of tapered grooves 14a are provided in the bearing surface 14 to direct lubricant to a pair of annular oil grooves 27a in the bearing ring 27.

The stud 20 extends through a cylindrical aperture 27c in the bearing ring 27 and is journaled therein on needle bearings 28 which are retained in a cage 29. The cage 29 is pressed into the cylindrical aperture 27c and has turned over end portions 29a, 29a coacting with the pointed ends 28a, 28a of the needle bearings to retain these bearings in the aperture.

Disposed about the stud 20 between the head of the stud and a recess 27d of the bearing ring 27 are three thrust washers 31, 32 and 33. The outside washers 31 and 33 are preferably made of hardened steel, as is the bearing ring 27 and the stud 20. The center washer 32 is preferably made of a metal, such as bronze, which has a relatively low but constant coefficient of friction against hardened steel.

A retainer 35 is disposed in the recess portion 17a of the closure cap 17 and has a depending skirt portion 35a extending into the recess. The cap member 35 is provided with a depressed socket portion 35b for receiving the rounded end 25 of the stud 20.

A coil spring 37 is held under compression between the closure cap 17 and a disk member 39 which has an annular marginal portion 39a extending above the member for contacting the cap member 35. Thus, when assembled, the spring 37 urges the cap member against the head of the stud which in turn presses the thrust washers 31, 32 and 33 and the bearing ring 27 into place in the housing 10.

In operation, tilting of the stud in all planes is accommodated by relative movement of the lubricated fragmental spherical surfaces of the housing and bearing ring 27 and rotation of the stud is accommodated by the needle bearings. However, during such rotation the steel washer 31 will tend to remain stationary in the recess 27d of the bearing ring 27 and the steel washer 33 will tend to rotate with the shoulder 24 of the stud head thereby establishing relative movement between the stud and bronze washers. Since a desired coefficient of friction is created by the bronze washer 32, the frictional resistance to rotation is controlled to prevent undesired freeness or looseness on the joint. Since the bronze washer has a low break-away resistance the frictional resistance is substantially constant. Thus, by making the center washer 32 of materials having known coefficients of friction with low break-away resistance, the force required to rotate the stud may be varied by changing the washers.

It is, of course, within the scope of this invention to make the upper thrust washer 31 integral with the bearing ring 27 or to make the lower thrust washer 33 integral with the head of the stud. Each of these arrangements will cause coaction of the steel surfaces with the bronze washer 32 in substantially the same way as above described.

A second embodiment of this invention is illustrated in Figure 2. As shown therein an open ended housing 40 has a substantially cylindrical bore 41 therein, provided near one end with a fragmental spherical socket portion terminating in a reduced diameter opening 43. The other end of the housing is closed by a plate 44 seated in a groove 45 formed in the housing wall. The plate 44 is held in position by peening or spinning the ends of the end of the housing thereover as indicated at 46.

A stud 47 projects through the opening 43 and has a shank with an intermediate tapered end portion 47a wedgingly secured in the eye end of an arm 49 by a nut 48 threaded on the end of the shank. The other end of the stud 47 has a head providing a shoulder 47b which is disposed between a cylindrical shank portion 47c and a rounded end portion 47d.

A bearing ring 50 is positioned in the housing 40 and has an outer segmental spherical bearing surface 51 in bearing engagement with the segmental spherical socket portion 42 of the housing. The bearing ring 50 has a central cylindrical aperture 50a which receives therethrough the shank 47c of the stud 47.

A thrust washer 52, preferably made of bronze, is disposed about the shank portion 47c of the stud 47 between the shoulder 47b and the bearing ring 50.

The various elements of the joint are urged into operating position by a pair of spring washers 54 and 55 compressed between the closure plate 44 and a spring seat member 56 which has a socket portion 56a adapted to receive the rounded end 47d of the stud.

A dust cover 58 made of a flexible material such as rubber is secured by a spring clip 59 to the outer wall of the housing 40. The upper end of the dust cover 58 has a collar portion 58a which fits closely around the shank of the stud, being rigidified at this point by a plurality of washers 60.

As in the embodiment of Figure 1, the thrust washer 52 is made of bronze or some other material which has a low breakaway resistance when in contact with the hardened steel of the bearing ring and stud.

From the above description it should be understood that this invention provides joint structures with controlled constant friction properties by utilizing thrust washers composed of materials having desired coefficients of friction and break away resistances.

It will, of course, be understood that various details of construction may be varied through a wide range without departing from the principles of this invention, and it is, therefore, not the purpose to limit the patent granted hereon otherwise than necessitated by the scope of the appended claim.

I claim as my invention:

A joint comprising a housing having a bearing surface therein, a bearing ring freely tiltable on said bearing surface and having a cylindrical bore extending therethrough, said bearing ring having a ferrous face directed toward the opposite side from said bearing surface, a stud extending through said bearing ring and freely rotatable in said bore, said stud having a ferrous bearing portion, said bearing portion affording a shoulder underlying said bearing ring, a non-ferrous material disk-type thrust washer disposed between said shoulder and said bearing ring in direct frictional resistance engagement with the opposing shoulder and said ferrous face portion of the bearing ring, said washer having low static frictional resistance characteristics, and spring means acting to thrust said stud and said bearing ring toward one another and thereby assure said resistance engagement.

JAMES H. BOOTH.

REFERENCES CITED

The following references are of record in the file of this patent:

UNITED STATES PATENTS

| Number | Name | Date |
| --- | --- | --- |
| 1,403,684 | Halvorsen | Jan. 17, 1922 |
| 1,592,665 | Janette | July 13, 1926 |
| 1,786,565 | Freeman | Dec. 30, 1930 |
| 2,388,950 | Booth | Nov. 13, 1945 |
| 2,521,335 | Booth | Sept. 5, 1950 |